United States Patent
Gersemsky et al.

(10) Patent No.: US 7,260,413 B2
(45) Date of Patent: Aug. 21, 2007

(54) DATA TRANSMISSION SYSTEM HAVING A HIGH DATA TRANSMISSION RATE AND METHOD OF TRANSMITTING THE DATA

(75) Inventors: Frank Gersemsky, Bochum (DE); Andre Neubauer, Krefeld (DE); Stefan Van Waasen, Duisburg (DE)

(73) Assignee: Infineon Technologies AG., Munich (DE)

( * ) Notice: Subject to any disclaimer, the term of this patent is extended or adjusted under 35 U.S.C. 154(b) by 238 days.

(21) Appl. No.: 10/723,632

(22) Filed: Nov. 26, 2003

(65) Prior Publication Data
US 2004/0114564 A1    Jun. 17, 2004

Related U.S. Application Data

(63) Continuation of application No. PCT/DE02/01624, filed on May 6, 2002.

(30) Foreign Application Priority Data
May 28, 2001 (DE) ................ 101 25 909

(51) Int. Cl.
*H04B 7/20* (2006.01)
(52) U.S. Cl. ............ 455/507; 455/502; 455/509; 455/561; 455/550.1; 370/347; 370/345; 370/442; 370/349
(58) Field of Classification Search ........... 455/502, 455/507, 501, 509, 561, 550.1; 370/347, 370/349, 350, 442, 345
See application file for complete search history.

(56) References Cited

U.S. PATENT DOCUMENTS

| | | | | |
|---|---|---|---|---|
| 4,868,811 A | * | 9/1989 | Suzuki | 370/436 |
| 5,278,689 A | * | 1/1994 | Gitlin et al. | 398/54 |
| 5,629,934 A | | 5/1997 | Ghosh et al. | |
| 5,737,325 A | * | 4/1998 | Fukuda | 370/337 |
| 5,771,224 A | | 6/1998 | Seki et al. | |

(Continued)

FOREIGN PATENT DOCUMENTS

DE    196 80 642 C2    1/1997

(Continued)

OTHER PUBLICATIONS

Karol, M. J. et al.: "Time-Frequency-Code Slicing: Efficiently Allocating the Communications Spectrum to Multirate Users", IEEE Transactions on Vehicular Technology, vol. 46, No. 4, Nov. 1997, pp. 818-826.

(Continued)

*Primary Examiner*—Joseph Feild
*Assistant Examiner*—Khai Nguyen
(74) *Attorney, Agent, or Firm*—Laurence A. Greenberg; Werner H. Stemer; Ralph E. Locher

(57) ABSTRACT

A data transmission system has a base station and at least one mobile station. Data packets are interchanged between the base station and the mobile station using a time slot method. In this case, first measures are used for transmission of a first part of a data packet at a predetermined first symbol rate and at a first transmission frequency, and second measures are used for transmission of a second part of the data packet at a second symbol rate and at a second transmission frequency.

33 Claims, 3 Drawing Sheets

U.S. PATENT DOCUMENTS

| | | | |
|---|---|---|---|
| 6,393,007 B1* | 5/2002 | Haartsen | 370/337 |
| 6,434,183 B1* | 8/2002 | Kockmann et al. | 375/132 |
| 6,490,261 B1* | 12/2002 | Dent et al. | 370/337 |
| 6,532,228 B1* | 3/2003 | Burgess et al. | 370/349 |
| 6,819,878 B1* | 11/2004 | King et al. | 398/189 |
| 6,873,615 B2* | 3/2005 | Ratzel | 370/349 |
| 6,958,987 B1* | 10/2005 | Herring et al. | 370/338 |
| 2002/0141479 A1* | 10/2002 | Garcia-Luna-Aceves et al. | 375/132 |
| 2003/0012175 A1* | 1/2003 | Sebire | 370/347 |
| 2005/0025042 A1* | 2/2005 | Hadad | 370/208 |

FOREIGN PATENT DOCUMENTS

| | | |
|---|---|---|
| EP | 0 491 495 A1 | 6/1992 |
| JP | 64-085436 | 3/1989 |
| WO | 00/70811 | 11/2000 |
| WO | WO 00/70811 * | 11/2000 |

OTHER PUBLICATIONS

Haartsen, J.: "Bluetooth—The Universal Radio Interface for ad hoc, Wireless Connectivity", Ericsson Review, No. 3, 1998, pp. 110-117, no month.

* cited by examiner

DATA TRANSMISSION SYSTEM HAVING A HIGH DATA TRANSMISSION RATE AND METHOD OF TRANSMITTING THE DATA

CROSS-REFERENCE TO RELATED APPLICATION

This application is a continuation of copending International Application No. PCT/DE02/01624, filed May 6, 2002, which designated the United States and was not published in English.

BACKGROUND OF THE INVENTION

Field of the Invention

The invention relates to a digital data transmission system that has at least two stations, between which data packets are interchanged by radio. The invention also relates to a method for digital transmission of the packet data between at least two stations by radio.

Data transmission systems such as these are frequently used when data packets are intended to be interchanged by radio over short distances. For example, this is done for interchanging data between the base part and the mobile part of a cordless telephone, or between a computer and peripherals. Data transmissions such as these, in which data is interchanged without the use of wires over short distances of only a few meters between a base station and mobile stations are referred to as pico networks. Pico networks can be operated in accordance with various standards, such as the Bluetooth or Digital European Cordless Telecommunications (DECT) Standard.

Data transmission from the base station to the mobile stations is referred to as the downlink. The opposite situation, of data transmission from the mobile stations to the base station, is referred to as the uplink step. Time slot methods are normally used for data transmission. In the case of time slot methods, the downlinks and uplinks are assigned time slots with a specific time duration. The time division multiple access (TDMA) method is frequently used as a multiple access method for the time slot method, and the time division duplex (TDD) method is used as the duplex method for forming a bidirectional channel between the base station and the mobile stations.

The frequencies that are available for data transmission in pico networks are defined by the Industrial, Scientific and Medical (ISM) frequency bands. The ISM frequency bands are reserved for radio-oriented use, without any licenses, at low transmission power levels.

The responsible regulation authority for use of the ISM frequency bands, the Federal Communication Commission (FCC) has defined rules as to how data is to be interchanged. One rule states that wire-free data transmission must be carried out using a frequency hopping method (Frequency Hopping Spread Spectrum (FHSS)). In addition, the FCC rules stipulate how many frequency changes must be carried out within a specific time interval.

Owing to the use of a frequency hopping method, the FCC rules require the use of a minimum number of non-overlapping frequency channels within an available frequency band. For example, one such frequency band may be in the range from 2400.0 MHz to 2483.5 MHz. In order to guarantee a narrowband transmission range within one frequency channel, a two-value Gaussian frequency shift keying (GFSK) modulation method using a symbol clock rate of 1 MHz and a modulation index $\eta$ is used in the range from 0.28 to 0.35, for example, for digital cordless communication systems which are based, for example, on the Bluetooth Standard. In the GFSK modulation method, a Gaussian filter is used to limit the frequency bandwidth, thus suppressing crosstalk between the individual frequency channels.

When using a frequency hopping method, the individual frequency channels are hopped to in a pseudo-random manner. This is done by using an algorithm that predetermines the time sequence of the channel mid-frequencies. The frequency in the center of a frequency channel is referred to as the channel mid-frequency.

At present, in the case of digital cordless communication systems that are based, for example, on the Bluetooth Standard, data is transmitted as standard at rates of 1 Mbit/s using frequency hopping methods. The methodology for allowing higher data transmission rates essentially includes the use of higher-quality modulation methods, such as the $\pi/4$-DQPSK-(Differential Quadrature Phase Shift Keying), $\pi/8$-D8PSK- or M-FSK-methods (Frequency Shift Keying), in which an M-value symbol, where $M=2^m$, is transmitted instead of a two-value bit. Higher-quality modulation methods generally require modification of the two-value GFSK modulation method that is used for digital cordless communication systems, and modifications of the associated transmitting and receiving stations.

In order to achieve higher data transmission rates in the Bluetooth Standard, it is likewise possible to increase the symbol rate by a factor N throughout the entire data transmission process, without changing the GFSK modulation method. The symbol rate is in this case the rate at which the phase of the oscillation that is used as the carrier frequency for data transmission is modulated. However, this also widens the required bandwidth for the frequency channels by the factor N. If the frequency hopping method is not matched to the increased symbol rate, then this results in overlapping frequency channels, which are not acceptable in accordance with the FCC rules. The algorithm that defines the sequence of the channel mid-frequencies must therefore be modified, so that the frequency channels have a wider bandwidth, which is matched to the increased symbol rate. The disadvantage of increasing the symbol rate in this way is that it adversely affects the operation of the Pico network. If, for example, there is a higher-rate data connection between the base station and one of the mobile stations, then it is impossible for the other mobile stations to synchronize themselves to the higher-rate data link since, on the one hand, the channel mid-frequency must be changed in accordance with the FCC requirements for a high-rate connection and, on the other hand, the symbol rate will not match the expected symbol rate of, for example, 1 Mbit/s.

SUMMARY OF THE INVENTION

It is accordingly an object of the invention to provide a data transmission system having a high data transmission rate and and method of transmitting the data that overcome the above-mentioned disadvantages of the prior art methods and devices of this general type, which complies with FCC rules, without interfering with normal operation of the data transmission system.

With the foregoing and other objects in view there is provided, in accordance with the invention, a data transmission system. The data transmission system contains a base station and at least one mobile station. Data packets are transmitted by radio using a time slot method between the base station and the mobile station. A first measure for transmitting a first part of a data packet at a predetermined first symbol rate and at a first transmission frequency is provided. A second measure for transmitting a second part of the data packet at a second symbol rate and at a second transmission frequency is provided.

A data transmission system according to the invention has a base station and at least one mobile station. Data packets can be interchanged by radio using a time slot method between the base station and the at least one mobile station. One major concept of the invention is for the data transmission system to have a first measure, by which a first part of a data packet is transmitted at a predetermined first symbol rate and at a first transmission frequency, and for the data transmission system furthermore to have a second measure, by which a second part of the data packet is transmitted at a second symbol rate and at a second transmission frequency. The first and the second symbol rate are in this case in each case the rates at which the phase of the oscillation that is used for data transmission is modulated. In this case, the oscillation is at the first or second transmission frequency, which is generally the channel mid-frequency.

The data transmission system according to the invention has the advantage that it allows higher data transmission rates than many conventional data transmission systems since, for example, the second symbol rate may be higher than the first symbol rate. For this purpose, the first part of the data packet is transmitted at the predetermined first symbol rate and at the first transmission frequency. The first symbol rate is normally the symbol rate that is used as standard during operation of the data transmission system. During the transmission of the first part of the data packet, all the receiving stations thus have the capability to synchronize themselves to the data transmission. The second part of the data packet, which generally contains the payload data in the data packet, is then transmitted at the higher, second symbol rate. Overall, this results in a higher data transmission rate for the entire data packet, in comparison to the conventional transmission of data packets. However, it should be noted that, if the second symbol rate is higher, the second transmission frequency must also have a different value to the first transmission frequency in order to prevent overlapping of frequency channels in accordance with the FCC rules. Suitable information in the first part of the data packet allows all the receiving stations to be informed of the second symbol rate and, if appropriate, of the second transmission frequency associated with it. There is therefore no interference with the normal operation of the data transmission system, which normally takes place at the predetermined first symbol rate.

A further advantage of the data transmission system according to the invention is that the data transmission rate is increased without needing to modify the modulation method that is used, for this purpose. It is thus possible to continue to use the two-value GFSK modulation method, for example, for digital cordless communications systems that operate using the Bluetooth Standard.

In order to guarantee that all the receiving stations can synchronize themselves to a possibly higher second symbol rate and to a second transmission frequency that is associated with it and is not the same as the first transmission frequency, the first part of the data packet advantageously contains information about the second symbol rate. In particular, the first part of the data packet may also contain information about the second transmission frequency. This is not absolutely essential, since the second transmission frequency can also be calculated from knowledge of the second symbol rate and an algorithm for the time sequence of the first transmission frequencies.

According to one advantageous refinement of the invention, a guard time interval is complied with between the transmission of the first and of the second part of the data packet. No data is transmitted during the guard time interval. In order to make it possible to carry out a change, which may be required, in the transmission frequencies between the transmission of the two parts of the data packet, the transmitting and receiving devices must normally have stabilized at the new transmission frequency. The transient process, which takes time, is taken into account by compliance with the guard time interval.

A further advantageous refinement of the invention provides for the base station and for the at least one mobile station each to have a local oscillator. The frequency of the local oscillator is used during transmission to up-mix the baseband signals to the respective transmission frequency. During reception, received signals are down-mixed by the local oscillator frequency to an intermediate frequency band. Local oscillators may be in the form of low-cost electronic components.

The local oscillators are advantageously each included in a phase locked loop (PLL). The phase locked loop regulates the frequency of the local oscillator at the frequency of a reference oscillator, to be precise sufficiently precisely that the phase difference is maintained. The phase locked loop on the one hand allows a frequency to be received, and on the other hand allows a desired frequency to be produced.

One preferred refinement of the invention is characterized in that the base station and the at least one mobile station each have a filter which is used for reception-end selection of the frequency channel. The bandwidth of the filter is likewise matched to the new bandwidth of the second transmission frequency while the transmission frequency is changed during the guard time interval.

According to further preferred refinements of the invention, identification information and a first data packet header are transmitted in the first part of a data packet. The respective receiver uses the identification information to identify the start of the transmission of a data packet that is intended for the associated data transmission system. The first data packet header contains, for example, information about the second symbol rate, the addressee of the data packet and, if appropriate, also about the second transmission frequency.

One particularly preferred refinement of the invention provides for a synchronization word to be transmitted in the second part of the data packet, with the synchronization word preferably being transmitted at the start of the second part. The synchronization word is used for synchronization of the transmitter and of the receiver to the second symbol rate. The synchronization prevents any possible data loss. A second data packet header may be provided after the synchronization word in the second part of the data packet, containing further information for connection control. The payload data is then transmitted.

The base station and the at least one mobile station advantageously each have access to an algorithm by which the sequence of the first transmission frequencies can be calculated. It is also possible to provide for the base station and the at least one mobile station likewise to have access to a further algorithm, which allows the calculation of the second transmission frequency.

The data transmission system according to the invention can be used, for example, in short-range digital cordless communication systems, such as cordless telephones with one or more mobile parts. A further application possibility is computer-controlled games systems. The mobile stations would in this case be the game pads for the individual players. Owing to the high data transmission rate, the use of the data transmission system according to the invention is particularly advantageous for systems that are subject to real-time requirements.

A further aspect of the invention relates to a method for radio transmission of data packets between a base station and at least one mobile station. For this purpose, a first part of a data packet is initially transmitted at a predetermined first symbol rate and at the first transmission frequency. A second part of the data packet is then transmitted at a second symbol rate and at the second transmission frequency.

The method according to the invention is advantageous since, for example, there is no need to transmit the entire data packet at just one predetermined symbol rate, and a higher, second symbol rate can be used in the second part. The use of a standard symbol rate as the first symbol rate provides the receiving stations with the capability to synchronize themselves to the data packets that are being transmitted.

Other features which are considered as characteristic for the invention are set forth in the appended claims.

Although the invention is illustrated and described herein as embodied in a data transmission system having a high data transmission rate and a method of transmitting the data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
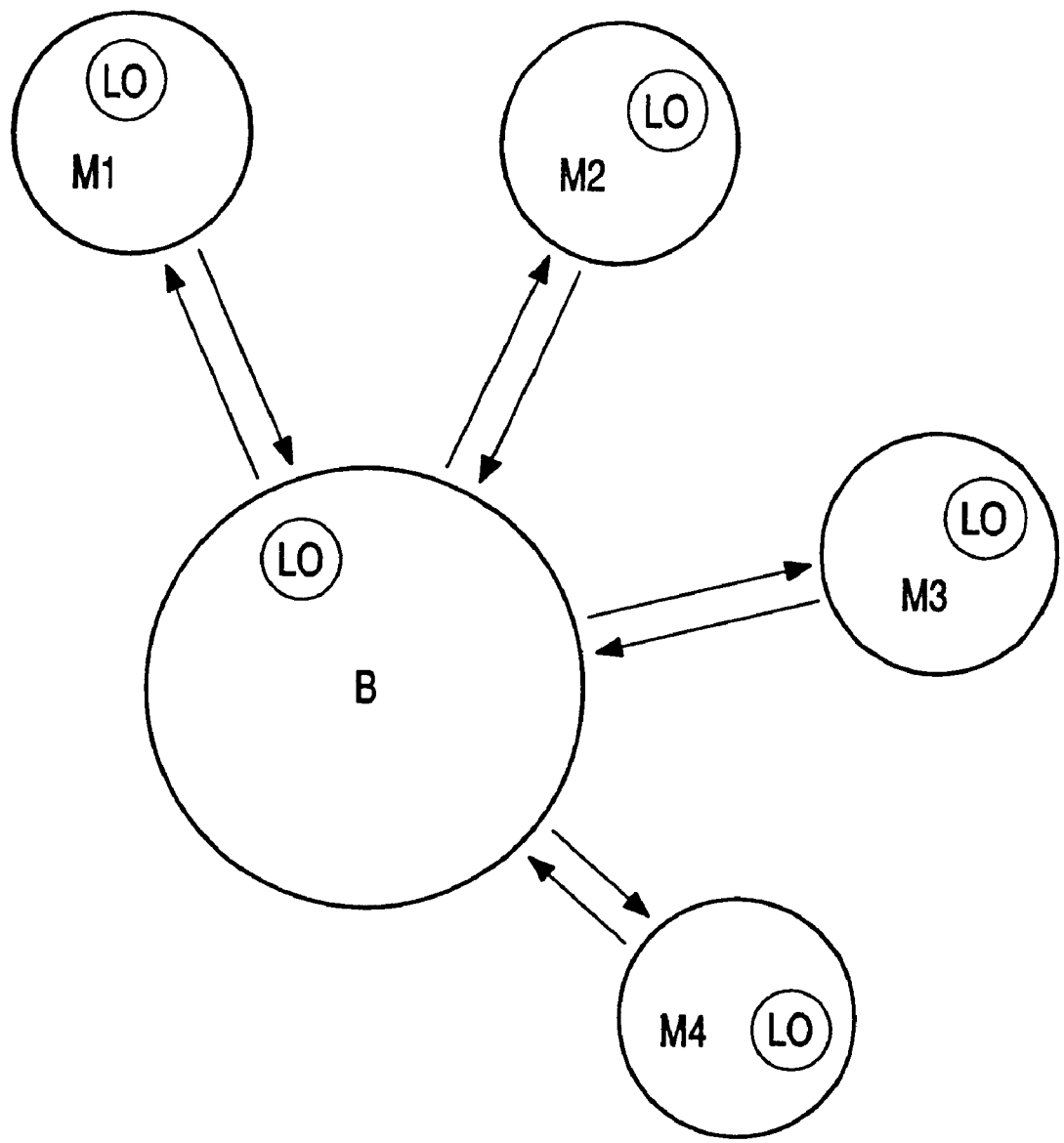
FIG. 1 is an illustration of a configuration of a data transmission system according to the prior art, which contains a base station and four mobile stations.

Referring now to the figures of the drawing in detail and first, particularly, to FIG. 1 thereof, there is shown a known data transmission system which contains a base station B and, for example, four mobile stations Mi (i=1, . . . , 4). The base station B can transmit data by radio to each of the mobile stations Mi. The mobile stations Mi can likewise transmit data by radio to the base station B. The base station B and the mobile station Mi each have a local oscillator LO for data transmission by radio. A data transmission system such as this containing the base station B and N mobile stations Mi is referred to as a pico network. Pico networks have only a short range.

In the case of the pico network illustrated in FIG. 1, the base station B and all of the mobile stations Mi each have transmitting and receiving devices. However, it is also possible to provide, for example, for only the base station B to have a transmitting device, and for only the base station B to have the capability to transmit data to the mobile stations Mi.

Figure 2:
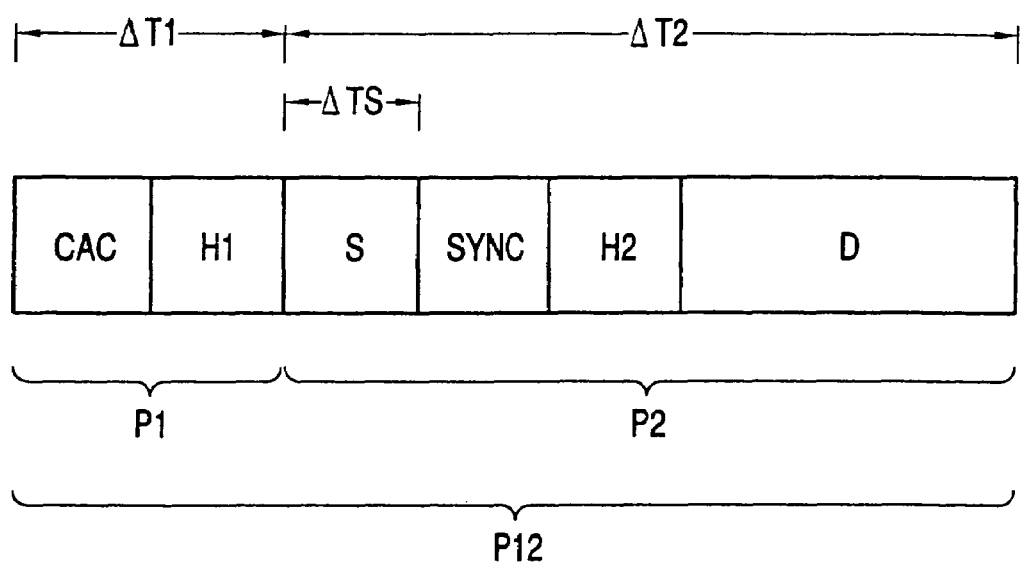
FIG. 2 is a block diagram of a frame structure for data transmission in a data transmission system according to the invention.

FIG. 2 shows a frame structure for a data packet P12, which can be interchanged by radio between the base station B and the mobile stations Mi in a data transmission system according to the invention. For example, let us assume that the data packets P12 are transmitted in the 2.4 GHz ISM frequency band. The FCC rules state that the transmission frequency within the frequency band must be varied after a specific time in accordance with a frequency hopping method. For this purpose, the frequency band is subdivided into frequency channels that do not overlap. The frequency located in the center of a frequency channel is referred to as the transmission frequency.

At the start of the transmission of the present data packet P12, a part P1 of the data packet P12 is transmitted during a time ΔT1 at a symbol rate R1 and at a transmission frequency F1, for example from the base station B, and is received by the mobile stations Mi. The symbol rate R1 is the standard symbol rate of 1 Mbit/s. At the start of the part P1, identification information channel access code (CAC) for the pico network is transmitted in accordance with the Bluetooth Standard, after which a data packet header H1 is transmitted. The data packet header H1 may, for example, contain information about a symbol rate R2 at which a part P2 of the data packet P12 following the part P1 will be transmitted during a time ΔT2. As a rule, the part P2 is transmitted at a higher rate than the part P1, so that, overall, the data packet P12 is transmitted at a high data transmission rate. Since a higher symbol rate R2 demands a wider bandwidth for the transmission frequency, a new transmission frequency F2 must be chosen for the part P2 of the data packet P12, in order to comply with the FCC requirements for non-overlapping frequency bands.

For this reason, the part P2 is preceded by a guard time interval S. No data is transmitted during the time ΔTS which is planned for the guard time interval S. The guard time interval S is used for stabilization of the local oscillators LO at the second transmission frequency F2, and in order to increase the bandwidth of the reception-end filters for selection of the frequency channel.

Following the guard time interval S, the mobile station B transmits a synchronization word SYNC. The synchronization word SYNC is used for symbol synchronization to the symbol rate R2. This is followed by a data packet header H2 with further control information and payload data D.

The amount of data that is transmitted in the part P1 of the data packet P12 is considerably less than the amount of data in the part P2. The high symbol rate R2 at which the part P2 is transmitted results, overall, in a high data transmission rate for the data packet P12.

Figure 3:
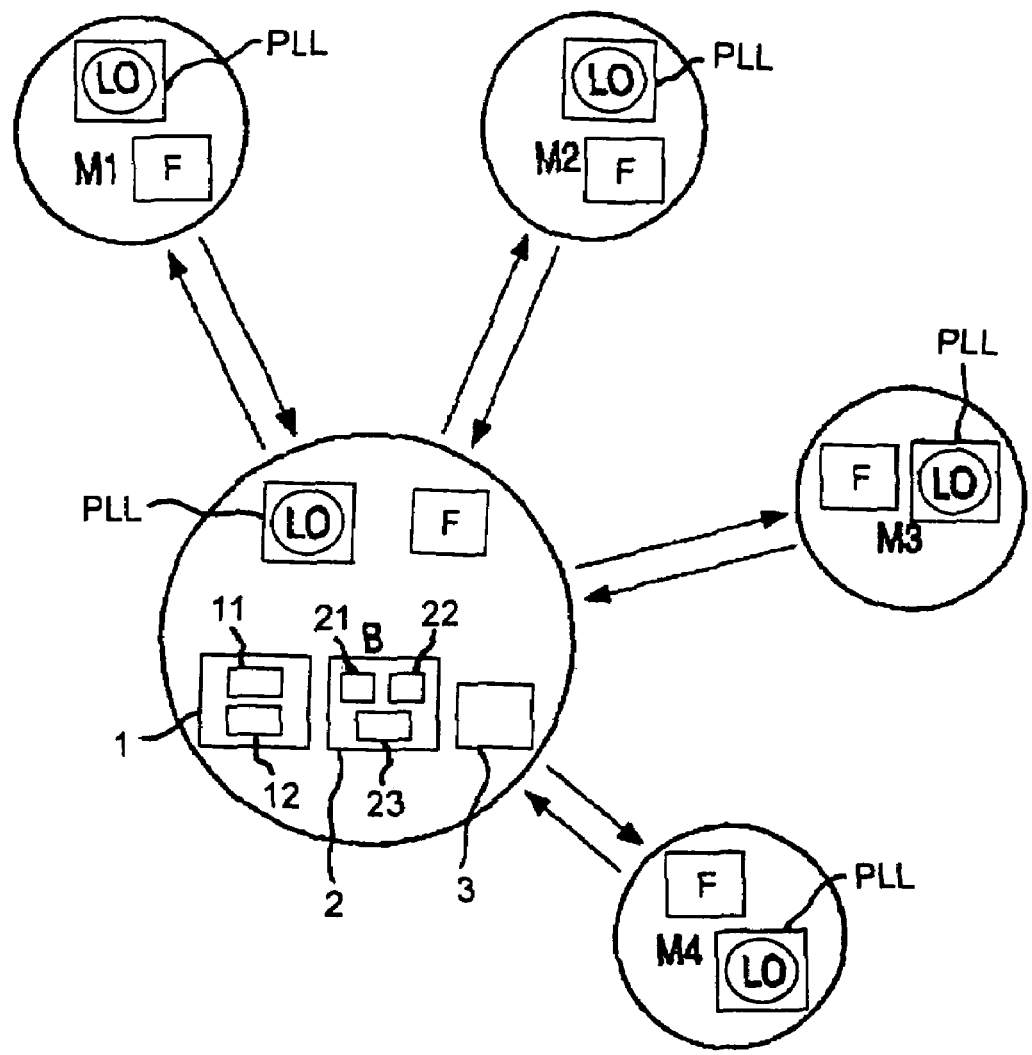
FIG. 3 is an illustration of a configuration of the data transmission system containing the base station and the four mobile stations according to the invention.

FIG. 3 shows a configuration of the data transmission system having the base station B and the mobile stations Mi. The base station B and the mobile stations all contain the local oscillator LO. The local oscillator LO is in each case connected to or part of a phase locked loop PLL. The base station B and the mobile station Mi each have a filter F for reception-end selection of a transmission frequency.

The base station B has a first device 1 for transmitting a first part of a data packet at a predetermined first symbol rate and at a first transmission frequency, and a second device 2 for transmitting a second part of the data packet at a second symbol rate and at a second transmission frequency. In addition, the base station B has a third device 3 for producing a guard time interval between the first part and the second part of the data packet.

The first device 1 has a first subunit 11 for producing identification information for identification of an association between the base station B and the mobile station Mi. In addition, the first unit 1 has a second subunit 12 for producing a first data packet header.

The second device 2 has a first subunit 21 for producing a synchronization word for synchronization of the base station B to the mobile station Mi at the second symbol rate. The second device 2 further has a second subunit 22 for producing a second data packet header, and a third subunit 23 for transmitting payload data.

Additionally, the base station and the mobile station each run an algorithm for calculating a sequence of first transmission frequencies, and an algorithm for calculating the second transmission frequency.

We claim:

1. A data transmission system, comprising:
   a base station;
   at least one mobile station, data packets can be transmitted by radio using a time slot method between said base station and said mobile station;
   first means for transmitting a first part of a data packet at a predetermined first symbol rate and at a first transmission frequency;
   second means for transmitting a second part of the data packet at a second symbol rate different from said predetermined first symbol rate and at a second transmission frequency different from said first transmission frequency; and
   said first part of the data packet and said second part of the data packet being transmitted at least one of to the same mobile station and from the same mobile station.

2. The data transmission system according to claim 1, wherein the first part of the data packet contains information about the second symbol rate.

3. The data transmission system according to claim 1, further comprising third means for producing a guard time interval between the first part and the second part of the data packet.

4. The data transmission system according to claim 1, wherein the second symbol rate is higher than the predetermined first symbol rate.

5. The data transmission system according to claim 1, wherein said base station and said mobile station each have a local oscillator.

6. The data transmission system according to claim 1, wherein each said local oscillator is in each case connected to a phase locked loop.

7. The data transmission system according to claim 1, wherein said base station and said mobile station each have a filter for reception-end selection of a transmission frequency.

8. The data transmission system according to claim 1, wherein said first means has means for producing identification information for identification of an association between said base station and said mobile station.

9. The data transmission system according to claim 1, wherein said first means has means for producing a first data packet head.

10. The data transmission system according to claim 1, wherein said second means has means for producing a synchronization word for synchronization of said base station to said mobile station at the second symbol rate.

11. The data transmission system according to claim 1, wherein the second means has means for producing a second data packet head, and means for transmitting payload data.

12. The data transmission system according to claim 1, wherein:
   said base station and said mobile station each have an algorithm for calculating a sequence of first transmission frequencies; and
   said base station and said mobile station each have an algorithm for calculating the second transmission frequency.

13. The data transmission system according to claim 1, wherein the data transmission system can be used in digital cordless communications systems, in computer-controlled entertainment systems, computer-controlled games systems, or in systems with real-time requirements.

14. The data transmission system according to claim 1, wherein the first part of the data packet contains information about the second transmission frequency.

15. A method for radio transmission of data packets between a base station and at least one mobile station, which comprises the steps of:
   transmitting a first part of a data packet at a predetermined first symbol rate and at a first transmission frequency;
   transmitting a second part of the data packet at a second symbol rate different from the predetermined first symbol rate and at a second transmission frequency different from the first transmission frequency; and
   the first part of the data packet and the second part of the data packet being transmitted at least one of to the same mobile station and from the same mobile station.

16. The Method according to claim 15, which further comprises transmitting information about the second symbol rate with the first part of the data packet.

17. The method according to claim 15, which further comprises complying with a guard time interval before transmitting the second part of the data packet.

18. The method according to claim 15, which further comprises setting the second symbol rate to be higher than the first symbol rate.

19. The method according to claim 15, which further comprises transmitting and/or receiving the data packet using a local oscillator provided in each of the base station and the mobile station.

20. The method according to claim 19, which further comprises connecting the local oscillator in each case to a phase locked loop.

21. The method according to claim 15, which further comprises filtering the transmission frequency, upon receiving the data packet, in the base station and the mobile station.

22. The method according to claim 15, which further comprises transmitting in the first part of the data packet identification information for identifying an association between the base station and the mobile station.

23. The method according to claim 15, which further comprises transmitting a first data packet header in the first part of the data packet.

24. The method according to claim 15, which further comprises transferring a synchronization word, for synchronization of the base station to the at least one mobile station, to the second symbol rate at a start of the second part of the data packet.

25. The method according to claim 15, which further comprises
   transmitting a second data packet header and payload data in the second part of the data packet.

26. The method according to claim 15, which further comprises providing the base station and the at least one mobile station respectively access to an algorithm for calculating a sequence of first transmission frequencies, and to an algorithm for calculating second transmission frequencies.

27. The method according to claim 15, which further comprises forming the base station and the mobile station as a digital cordless communications system.

28. The method according to claim 15, which further comprises forming the base station and the mobile station as a computer-controlled entertainment system.

29. The method according to claim 15, which further comprises forming the base station and the mobile station as a computer-controlled game system.

30. The method according to claim 15, which further comprises forming the base station and the mobile station as a system with real-time requirements.

31. The method according to claim 15, which further comprises transmitting information about the second transmission frequency with the first part of the data packet.

32. A data transmission system, comprising:
a base station; and
at least one mobile station, data packets can be transmitted by radio using a time slot method between said base station and said mobile station;
said base station and said mobile station programmed to transmit a first part of a data packet at a predetermined first symbol rate and at a first transmission frequency;
second base station and said mobile station programmed to transmit a second part of the data packet at a second symbol rate different from said predetermined first symbol rate and at a second transmission frequency different from said first transmission frequency; and
said first part of the data packet and said second part of the data packet being transmitted at least one of to the same mobile station and from the same mobile station.

33. The data transmission system according to claim 32, said base station and said mobile station further programmed to produce a guard time interval between the first part and the second part of the data packet.

* * * * *